United States Patent [19]

Welna

[11] Patent Number: 4,952,615
[45] Date of Patent: Aug. 28, 1990

[54] COMPRESSIBLE FIREPROOF SEAL

[75] Inventor: Walton W. Welna, Woodbury, Minn.

[73] Assignee: Minnesota Mining and Manufacturing Company, St. Paul, Minn.

[21] Appl. No.: 193,897

[22] Filed: May 13, 1988

[51] Int. Cl.$^5$ .............................................. C09K 3/28
[52] U.S. Cl. ..................................... 523/179; 521/85; 521/91; 521/92; 521/98; 521/145; 521/150
[58] Field of Search ..................... 523/179; 521/85, 91, 521/92, 98, 145, 150

[56] References Cited

U.S. PATENT DOCUMENTS

| | | | |
|---|---|---|---|
| 3,639,299 | 2/1972 | MacDovall | 521/88 |
| 4,130,538 | 12/1978 | Shutt | 523/513 |
| 4,266,039 | 5/1981 | Hons-Olivier et al. | 521/85 |
| 4,521,333 | 6/1985 | Grohour et al. | 521/122 |

Primary Examiner—Morton Foelak
Attorney, Agent, or Firm—Donald M. Sell; Walter N. Kirn; Andrew D. Sorensen

[57] ABSTRACT

A fireproof, compressible, intumescent, elastomeric material useful to seal expansion joints, curtain wall gaps and penetrations in floors and walls in order to prevent the passage of flame and smoke. A seal of the material retains strength before and after exposure to fire and provides superior resistance to the impact, erosion, and cooling effects of a hose stream used to combat a fire. The composition of this compressible, fireproof material consists of elastomers, vulcanizing agents, fillers, softening agents, and an intumescent. This fireproof material may be in cellular or noncellular form with various degrees of compressibility and softness. It can be produced in sheets, molded parts, and continuous length strips. It may be vulcanized or nonvulcanized.

14 Claims, No Drawings

COMPRESSIBLE FIREPROOF SEAL

FIELD OF THE INVENTION

The present invention relates to fireproof, compressible, intumescent materials for use in sealing expansion joints, curtain wall gaps and penetrations in floors and walls to prevent the passage of flame and smoke.

BACKGROUND OF THE INVENTION

Modern building construction utilizes fire resistive walls and floors to confine the spread of fires; yet mechanical and electrical piping, electrical cable, and duct work penetrate, and construction gaps, expansion joints, and curtain wall openings may occur in these assemblies. Unsealed openings and penetrations diminish the effectiveness of fire rated walls and floors, threatening life, property and operations by allowing smoke and flames to pass unchecked through the building.

A fire stop must maintain its sealing properties not only in the initial stages of a fire, but also as it heats and burns as the fire matures. In essence, this means that the fireproof seal must contain an ingredient or ingredient combination which can replace any volume lost as the polymeric base and/or fillers and extenders are used up during a fire or flash fire condition. This property of compensating that lost mass is commonly referred to as intumescence.

Elastic fireproof materials employing an elastomer, vulcanizing agents and an intumescent mineral are disclosed in U.S. Pat. No. 4,266,039 (Hons-Olivier, et. al.). Hons-Olivier, et al, teaches the use of nondehydrated vermiculite mineral as the intumescent. Repeated trials incorporating this mineral in a compressible composition resulted in spongy structures that either failed to pass the ASTM E-814 fire test, or failed to exhibit sufficient softness as measured by compression-deflection. Vermiculite has insufficient expansion and tends to produce a composition with a friable char. A prime requirement to survive the ASTM E-814 fire test is the ability of the composition to intumesce and form a char strong enough to withstand the hose stream test. Increasing the quantity of vermiculite to obtain better expansion is deleterious to char strength and softness.

It is therefore an object of this invention to provide an effective, compressible, fireproof seal for use during flame and heat exposure and especially to provide for improved resistance during the subsequent impact, erosion and cooling effects of a hose stream.

SUMMARY OF THE INVENTION

The present invention provides a compressible fireproof seal in extruded or molded form with outstanding fire and hose stream resistance properties. The seal is produced from elastomers, vulcanizing agents, fillers, softening agents and an intumescent mineral.

The uniqueness of this invention lies in using an alkali metal silicate intumescent in conjunction with a naphthenic oil softening agent. This combination provides the means to obtain materials with softness, compressibility, resistance to flame and heat, and strength to withstand pressurized water from a fire hose stream.

Unexpectedly, materials containing alkali metal silicate and naphthenic oil produced fireproof seals superior to materials containing vermiculite. Alkali metal silicate/naphthenic oil containing materials were superior to vermiculite containing materials in softness and when heated, in expansion. Alkali metal silicate containing materials when heated form a glassy siliceous matrix greatly enhancing char strength. The charred siliceous matrix resists the ablative action of a fire.

During the initial stages of a fire, the alkali metal silicate starts to expand as the seal begins to char. This expansion more than compensates for shrinkage due to organic loss. Expansion of alkali metal silicate and charring of the organic matrix physically lock the material into position, sealing the void. The seal remains intact at temperatures exceeding 1000° C. and the strength of the matrix is sufficient to prevent its dislodgment from the impact of a stream of water from a fire hose for a minimum of two hours from the inception of the test.

DETAILED DESCRIPTION OF THE INVENTION

The present invention relates to a fireproof seal consisting of an elastomer, vulcanizing agents, a softening agent with a relatively high aromatic content for compatibility to provide softness, a flame retardant plasticizer, fillers for both flame retardant and mechanical properties, and an alkali metal silicate intumescent. If a sponge fireproof material is desired, a combination of blowing agents such as azocarbonamide and benzenesulfonyl hydrazide is incorporated to generate the sponge during processing. In addition, calcium sodium metaphosphate can be added to improve green strength if necessary.

The uniqueness of this invention lies in the use of an alkali metal silicate, e.g., hydrated sodium silicate, as the intumescent in combination with a softening oil, particularly, a naphthenic oil. This combination provides the excellent fire and hose stream resistance performance and the compressibility required in the construction industry.

Ingredients used to produce compressible fireproof seals of the invention as will be shown in the following examples are listed and described in Table I.

TABLE I

| Ingredient | Supplier | Description |
| --- | --- | --- |
| Neoprene WHV-100 | DuPont | Flame retardant polychloroprene rubber having a Mooney viscosity in the medium-high range. |
| Butachlor MH-30 | A. Schulman | Flame retardant polychloroprene rubber having Mooney viscosity in the high range. |
| Wingstay 100 | Goodyear | Antioxidant consisting of mixed diaryl p-phenylenediamine. |
| Mag-Paste Gold | Elastochem | 55% highly active magnesium oxide dispersed in an organic binder. Vulcanizing agent. |
| Iron Oxide | U.S. Steel | Iron Oxide by-products of steel blast furnaces. Colorant. |
| Antimony Oxide | Harwick | Flame retardant. |
| Elasto-O-Cal 8ONS | Elastochem | A drying agent containing 80% calcium oxide in an organic binder. |
| Struktrol WB-222 | Struktrol | High molecular weight fatty acid esters used as a processing aid. |
| Petrolatum SR-172 | C. P. Hall | Petroleum semi-solid wax of the aliphatic hydrocarbon class. Release agent. |
| Chlorowax 65 | Occidental | A liquid chlorinated |

TABLE I-continued

| Ingredient | Supplier | Description |
|---|---|---|
| | Chemical | paraffin with approximately 65% chlorine content. Secondary plasticizer and flame retardant. |
| Ultraflex Wax | Petrolite | Processing aid wax. |
| Solem H-36 | Solem Industries | Hydrated aluminum oxide with a medium particle size of 25 microns. Flame retardant and filler. |
| Cab-O-Sil M5 | Cabot | Cab-O-Sil is silica produced through flame hydrolysis of silicon tetrachloride at about 1100° C. Filler to enhance physical properties. |
| ECP (AZO)-72 | Elastochem | A blowing agent dispersion of Celogen AZ199, Celogen AZ130, Celogen OT, and Sunthene 4240 in 5,10,5 and 7.78 parts by weight ratios respectively. |
| Sunthene 4240 | Sun Oil | Softening agent refined from napthenic crude oil containing 46.7% aromatics. |
| PBETU-75 | Elastochem | A 75% by weight dispersion of ethylene thiourea in a polymeric binder. Used as an accelerator for neoprene rubber. |
| MBTS | Uniroyal Chemical | 2, 2' dibenzothiazyl disulfide. Used as a retardant |
| Sulfur | C. P. Hall | A find grind rubber makers sulfur. Vulcanizing agent. |
| Elast-O-Zinc | Elastochem | An 88% active zinc oxide paste, utilizing high purity, activation grade French process zinc oxide. Vulcanizing agent. |
| Expantrol 4 | 3M | Hydrated sodium silicate containing boron. Intumescent when heated |

The ingredients are mixed on conventional rubber processing equipment. This equipment includes rubber mill, Banbury, or intermix compounding. After mixing, the mill base is slabbed, cooled, and allowed to age a minimum of 24 hours. Alternatively, the mill base is cut into strips, festooned, cooled, and aged. After aging, the mill base is extruded or molded into the desired shape and vulcanized in a hot air oven, or in a salt bath, or in a heated press. Instead of extruding or molding, the mill base can be calendered or pressed and cut to the desired shape. A sponge is obtained by incorporating blowing agents.

To demonstrate the utility of this invention the following examples were prepared. In the examples, PHR means parts per hundred weight rubber.

EXAMPLE 1

| Ingredient | PHR |
|---|---|
| Neoprene WHV-100 | 70.0 |
| Butachlor MH-30 | 30.0 |
| Wingstay 100 | 2.00 |
| Mag-Paste Gold | 7.27 |
| Iron Oxide | 8.00 |
| Antimony Oxide | 5.00 |
| Elasto-O-Cal 8ONS | 7.00 |
| Struktrol WB-222 | 2.50 |
| Petrolatum SR-172 | 3.00 |
| Chlorowax 65 | 15.0 |
| Ultraflex Wax | 3.00 |
| Solem H-36 | 25.0 |
| Cab-O-Sil M5 | 6.96 |
| ECP (AZO)-72 | 13.9 |
| Sunthene 4240 | 27.4 |
| PBETU-75 | 4.00 |
| MBTS | 1.00 |
| Sulfur | 1.00 |
| Elasto-O-Zinc | 5.68 |
| Expantrol 4 | 150 |

The ingredients were compounded on a 2-roll rubber mill. The mill base was cut into strips and the strips fed into an extruder. The extrudate was continuously sponged and vulcanized in a hot air oven.

The following properties were obtained on the sponge:

| | |
|---|---|
| Sponge density: | 50.7 #/cubic ft (812 kg/m$^3$) |
| Expansion: | 226% |
| Compression-Deflection | |
| @10% Deflection: | 2.77 psi (19.1 kPa) |
| @25% Deflection: | 6.73 psi (46.4 kPa) |
| @33-⅓% Deflection: | 10.7 psi (73.8 kPa) |
| @50% Deflection: | 31.0 psi (214 kPa) |

Fire Test: >2.00 hrs.*

* Tested for 2 hours followed with successful passing of a hose stream test.

EXAMPLE 2

| Ingredient | PHR |
|---|---|
| Neoprene WHV-100 | 70.0 |
| Butachlor MH-30 | 30.0 |
| Wingstay 100 | 2.00 |
| Mag-Paste Gold | 7.27 |
| Iron Oxide | 8.00 |
| Antimony Oxide | 5.00 |
| Elast-O-Cal 8ONS | 7.00 |
| Struktrol WB-22 | 2.50 |
| Petrolatum SR-172 | 3.00 |
| Chlorowax 65 | 15.0 |
| Ultraflex Wax | 3.00 |
| Solem H-36 | 25.0 |
| Cab-O-Sil M5 | 2.50 |
| Celogen AZ130 | 6.66 |
| Celogen AZ199 | 3.33 |
| Sunthene 4240 | 32.8 |
| PBETU-75 | 5.33 |
| MBTS | 1.00 |
| Sulfur | 1.00 |
| Elasto-O-Zinc | 5.68 |
| Expantrol 4 | 150 |

The ingredients were compounded on a 2-roll rubber mill. The mill base was hot pressed at 65° C. into the desired thickness, cut to size, and sponged and vulcanized in a hot air over.

The following properties were obtain on the sponge:

| | |
|---|---|
| Sponge density | 43.9 #/cubic ft (703 kg/m$^3$) |
| Sponge expansion: | 157% |
| Compression-Deflection | |

| | |
|---|---|
| @10% Deflection: | 3.94 psi (27.2 kPa) |
| @25% Deflection: | 10.8 psi (74.5 kPa) |
| @33-⅓% Deflection: | 16.4 psi (113 kPa) |
| @50% Deflection: | 35.7 psi (245 kPa) |
| Fire Test: | 5.4 hr |
| Green Strength (R.T.): | 4.97 psi (34.3 kPa) |

EXAMPLE 3

| Ingredients | PHR |
|---|---|
| Neoprene WHV-100 | 70.0 |
| Butachlor MH-30 | 30.0 |
| Wingstay 100 | 2.00 |
| Mag-Paste Gold | 7.27 |
| Iron Oxide | 8.00 |
| Antimony Oxide | 5.00 |
| Elasto-O-Cal 8ONS | 7.00 |
| Struktrol WBK-222 | 2.50 |
| Petrolatum SR-172 | 3.00 |
| Chlorowax 65 | 15.0 |
| Solem H-36 | 25.0 |
| Cab-O-Sil M5 | 7.50 |
| ECP (AZO)-72 | 27.8 |
| Sunthene 4240 | 17.8 |
| PBETU-75 | 5.33 |
| Sulfur | 1.00 |
| Elast-O-Zinc | 5.68 |
| Expantrol 4 | 150 |

The ingredients were compounded on a 2-roll rubber mill. The mill base was hot pressed at 65° C. into the desired thickness, cut to size, and sponged and vulcanized in a molten salt bath.

The following properties were obtained on the sponge:

| | |
|---|---|
| Sponge density: | 41.8 #cubic ft (670 kg/m³) |
| Sponge Expansion: | 162% |
| Compression-Deflection: | |
| @10% Deflection: | 4.6 psi (32 kPa) |
| @25% Deflection: | 9.6 psi (66 kPa) |
| @33-⅓% Deflection: | 13.9 psi (95.8 kPa) |
| @50% Deflection: | 46.8 psi (323 kPa) |
| Fire Test: | 4.7 hrs. |

EXAMPLE 4

| Ingredients | PHR |
|---|---|
| Neoprene WHV-100 | 70.0 |
| Butachlor MH-30 | 30.0 |
| Wingstay 100 | 2.00 |
| Mag-Paste Gold | 7.27 |
| Iron Oxide | 8.00 |
| Antimony Oxide | 5.00 |
| Elast-O-Cal 8ONS | 7.00 |
| Struktrol WB-222 | 2.50 |
| Petrolatum SR-172 | 3.00 |
| Chlorowax 65 | 15.0 |
| Ultraflex Wax | 3.00 |
| Solem H-36 | 25.0 |
| Calcium Sodium Metaphosphate Fiber | 15.0 |
| Cab-O-Sil M5 | 5.00 |
| Celogen OT | 8.33 |
| Celogen AZ130 | 11.1 |
| Celogen AZ199 | 5.56 |
| Sunthene 4240 | 20.3 |
| PBETU-75 | 5.33 |
| MBTS | 1.00 |
| Sulfur | 1.00 |
| Elast-O-Zinc | 5.68 |

| Ingredients | PHR |
|---|---|
| Expantrol 4 | 150 |

The ingredients were compounded on a 2-roll rubber mill. The mill base was hot pressed at 65° C. to the desired thickness, cut to size, and sponged and vulcanized in a hot air oven.

The following properties were obtained on the sponge:

| | |
|---|---|
| Sponge density: | 48.6 #/cubic ft (779 kg/m³) |
| Sponge expansion | 107% |
| Compression-Deflection: | |
| @10% Deflection | 5.90 psi (40.7 kPa) |
| @25% Deflection | 12.3 psi (84.8 kPa) |
| @33-⅓% Deflection | 17.1 psi (118 kPa) |
| @50% Deflection | 49.3 psi (340 kPa) |
| Fire Test: | 3.00 hrs. |
| Green Strength (R.T.): | 9.48 psi (65.4 kPa) |

Calcium sodium metaphosphate fiber, obtained from Monsanto Corp., improved the green strength without detriment to sponge softness. When Wolastinite fibers were incorporated in the composition, sponge softness decreased considerably. Although not essential in the composition, the addition of calcium sodium metaphosphate fiber provides greater latitude in processing the sponge.

The ingredients listed in the previous examples can also be molded into a cellular fireproof seal. By removing the blowing agents, noncellular fireproof seals are obtained. In preferred compositions, the plasticizer concentration is modified. In the following example the plasticizer content was lowered, the blowing agents removed to produce a noncellular part, and although not necessary, the drying agent and processing aid removed. EXAMPLE 5

Molded Part

| Ingredients | PHR |
|---|---|
| Neoprene WHV-100 | 70.0 |
| Butachlor MH-130 | 30.0 |
| Wingstay 100 | 2.00 |
| Mag-Paste Gold | 7.27 |
| Iron Oxide | 8.00 |
| Antimony Oxide | 5.00 |
| Chlorowax 65 | 15.0 |
| Ultraflex Wax | 3.00 |
| Solem H-36 | 25.0 |
| Cab-O-Sil M5 | 6.96 |
| Sunthene 4240 | 10.0 |
| PBETU-75 | 4.00 |
| MBTS | 1.00 |
| Sulfur | 1.00 |
| Elast-O-Zinc | 5.68 |
| Expantrol 4 | 150 |

The ingredients were compounded on a 2-roll rubber mill. Mill base was molded for 10 min. at 149° C. into sheets 6.4 mm ×30.5 cm×30.5 cm, or for 5 min. at 165° C. into tubes 1.6 cm ID×2.3 cm OD×32.4 cm.

| Properties:* | |
|---|---|
| Density | 76.8 #/cubic ft (1230 kPa) |
| Char Density | 13.1 #/cubic ft (210 kPa) |
| Expansion | 316% |
| Tensile Strength | 360 psi (2180 kPa) |

-continued

| Properties:* | |
|---|---|
| Ultimate Elongation | 457% |
| Shore A Hardness | 60.0 |
| Fire Test | >2.0 hrs. |

*The fire test was run on molded tubes. All other tests were on specimens taken from molded sheets.

Comparative examples were run utilizing the teachings of examples 1, 2 and 6 of U.S. Pat. No. 4,266,039 (Hons-Olivier, et al). Additional comparative examples were run by substituting vermiculite for the alkali metal silicate in the examples of this invention. In either situation, the resulting compressible fireproof seal could not pass the ASTM E-814 fire test. The preferred intumescent of the present invention is a composition comprising a mixture of alkali metal silicate, represented by the formula $M_2O:xSiO_2$ in which M is alkali metal; at least one oxy boron compound; and water; in which x (weight ratio of silica to alkali metal oxide) ranges from about 1.5 to about 4, the molar ratio of boron to M is between about 0.2 and about 0.9, and the water comprises about 5 to 15 weight percent of the total composition.

Examples of useful alkali metal silicates are sodium silicate, lithium silicate and potassium silicate; sodium silicate being preferred. A mixture of alkali metal silicates can be used. Thus M may stand for an admixture of alkali metals in silicate form.

For purposes of this description, the term "oxy boron" or "borate" means any compound having a radical which contains boron and oxygen, such as the metaborate, tetraborate, perborate, or polyborate radicals. Examples of suitable oxy boron compounds are: boric acid and borate salts of Group I and II elements, including naturally occurring borate compounds, such as borax and colemanite. By Group I and II elements, it is meant all elements in Groups IA, IB, IIA and IIB of the periodic table of elements. Some additional examples of suitable borates are calcium metaborate, magnesium borate, and zinc borate.

The temperature at which expansion or intumescence begins with these silicate compositions can be controlled as needed for the application. Generally, the lower the concentration of water the higher is the temperature of intumescence. There is preferably about 5 to 10 weight percent water in the composition. Also, if a higher intumescence activation temperature is required, this can be accomplished by adding calcium hydroxide to the basic formulation. If a lower activation temperature is needed, borax can be used in place of boric acid as the oxy boron compound.

For cases in which the borate is the salt of an alkali metal (e.g., borax or sodium borate) the alkali metal originating from the oxy boron compound will become part of the composition, and this alkali metal is included in calculating the ratio x stated above between the silica and alkali metal.

The amount of the preferred intumescent when a cellular, compressible fireproof seal is desired should be between 130 PHR and 200 PHR and preferably between 140 PHR and 180 PHR. When a noncellular compressible fireproof seal is desired, the amount of preferred intumescent should be between 100 PHR and 200 PHR and preferably between 130 PHR and 170 PHR.

Furthermore, according to the teaching of this invention a preferred softening agent is napthenic oil. The amount of this preferred softening agent when a cellular compressible fireproof seal is desired should be between 25 PHR and 45 PHR and preferably between 30 PHR and 40 PHR. When a noncellular compressible fireproof seal is desired the amount of napthenic oil should be between 5 PHR and 30 PHR and preferably between 15 PHR and 20 PHR.

Various omissions, modifications and changes to the principles described herein may be made by one skilled in the art without departing from the true scope and spirit of the invention which is indicated by the following claims. For example, a useful filler in place of hydrated aluminum oxide or silica could be clay.

I claim:

1. A fireproof seal which is compressible at low temperature and which swells at high temperature to provide a low and high temperature smoke, flame, and hose stream resistant barrier, said seal comprising halogenated rubber elastomers, vulcanizing agents, fillers, napthenic oil as a softening agent and an alkali metal silicate intumescent mineral.

2. A fireproof seal according to claim 1 wherein the alkali metal silicate is a composition represented by the formula $M_2O:xSiO_2$ in which M is the alkali metal; at least one oxy boron compound selected from the group consisting of boric acid and borate salts of Group I and II elements; and water; in which the weight ratio x ranges from about 1.5 to about 4, the molar ratio of boron to M is between about 0.2 and about 0.9, and the water comprises about 5 to 15 weight percent of the total composition.

3. A fireproof seal according to claim 1 wherein the alkali metal silicate is selected from the group consisting of sodium silicate, potassium silicate and lithium silicate.

4. A fireproof seal according to claim 1 wherein the alkali metal silicate is comprised of sodium silicate.

5. A fireproof seal according to claim 2 wherein the oxy boron compound is selected from the group consisting of boric acid, calcium metaborate, sodium borate, zinc borate, and colemanite.

6. A fireproof seal according to claim 5 wherein the oxy boron compound is boric acid.

7. A fireproof seal according to claim 1 wherein the seal is cellular and the alkali metal silicate is between 130 PHR and 200 PHR.

8. A fireproof seal according to claim 1 wherein the seal is noncellular and the alkali metal silicate is between 100 PHR and 200 PHR.

9. A fireproof seal according to claim 1 wherein the seal is cellular and the amount of napthenic oil is between 25 PHR and 45 PHR.

10. A fireproof seal according to claim 1 wherein the seal is noncellular and the amount of napthenic oil is between 5 PHR and 30 PHR.

11. A fireproof seal according to claim 1 wherein the halogenated rubbers are polychlororprene rubbers.

12. A fireproof seal according to claim 1 wherein the vulcanizing agents are selected from magnesium oxide, zinc oxide and lead oxide.

13. A fireproof seal according to claim 1 wherein the fillers are selected from hydrated aluminum oxide, silica and clay.

14. A fireproof seal according to claim 1 to which calcium sodium metaphosphate fiber has been added.

* * * * *

UNITED STATES PATENT AND TRADEMARK OFFICE
CERTIFICATE OF CORRECTION

PATENT NO. : 4,952,615

DATED : August 28, 1990

INVENTOR(S) : WELNA, Walton W.

It is certified that error appears in the above-identified patent and that said Letters Patent is hereby corrected as shown below:

Column 3, line 35, "A find grind rubber" should read --A fine grind rubber--

Column 4, line 62, "over" should read --oven--.

Column 4, line 63, "obtain" should read --obtained--.

Column 8, line 58, "polychlororprene" should read --polychloroprene--.

Signed and Sealed this

Third Day of December, 1991

Attest:

HARRY F. MANBECK, JR.

*Attesting Officer*     *Commissioner of Patents and Trademarks*